Sept. 29, 1964 M. P. BUDNEY ETAL 3,150,546
JIG BORER
Filed March 10, 1960 3 Sheets-Sheet 1

INVENTORS
M.P. BUDNEY,
H.S. BUDNEY,
T.W. BUDNEY &
M.F. SACZAWA

BY
ATTORNEY

Sept. 29, 1964 M. P. BUDNEY ETAL 3,150,546
JIG BORER
Filed March 10, 1960 3 Sheets-Sheet 2

INVENTORS
M. P. BUDNEY,
H. S. BUDNEY,
T. W. BUDNEY &
M. F. SACZAWA

BY
ATTORNEY

Sept. 29, 1964 M. P. BUDNEY ETAL 3,150,546
JIG BORER
Filed March 10, 1960 3 Sheets-Sheet 3

INVENTORS
M.P. BUDNEY,
H.S. BUDNEY,
T.W. BUDNEY &
M.F. SACZAWA

BY

ATTORNEY

United States Patent Office 3,150,546
Patented Sept. 29, 1964

3,150,546
JIG BORER
Michael P. Budney, Berlin, Henry S. Budney and Thaddeus W. Budney, Newington, and Matthew F. Saczawa, Wethersfield, Conn., assignors to Atlantic Machine Tool Work, Inc., Newington, Conn.
Filed Mar. 10, 1960, Ser. No. 14,073
2 Claims. (Cl. 77—4)

The present invention relates to an automatic jig borer and more particularly to a borer occupying a minimum of vertical space, a control for accurately varying the speed of the spindle and feed and an arrangement including optics for obtaining precise location of the work.

Heretofore, jig borers have provided various types of adjustments and speeds, but the adjustments have been difficult to obtain, requiring a high degree of skill and an excessive amount of time resulting in high cost to obtain acceptable work, and the borer have occupied an excessive amount of vertical space.

An object of the present invention is to provide a jig borer of extreme accuracy which occupies a minimum of space with a readily assembled and mounted speed change transmission providing for ease of servicing and repair.

A still further object is to provide an accurate clamping structure for securing the quill housing to the upright column of a jig borer, and a quill supported structure to measure the movement of the quill.

Figure 1:
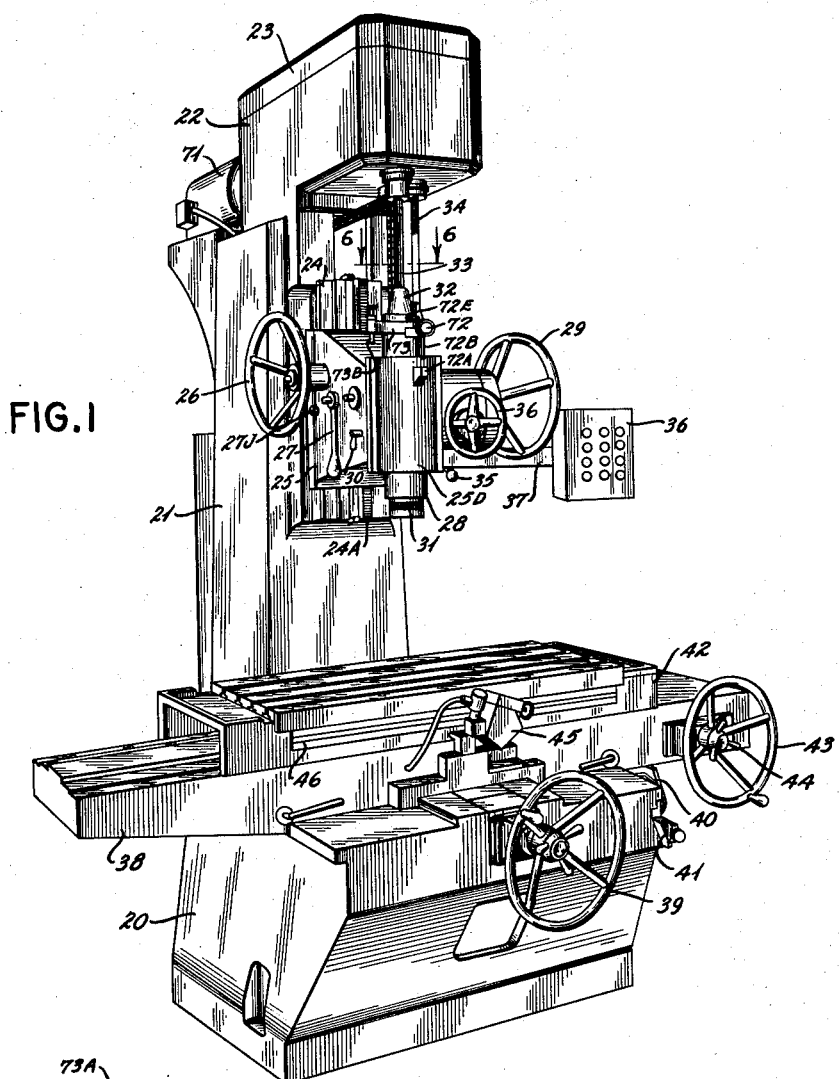
Figure 6:
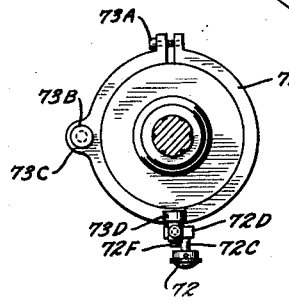
Figure 2:
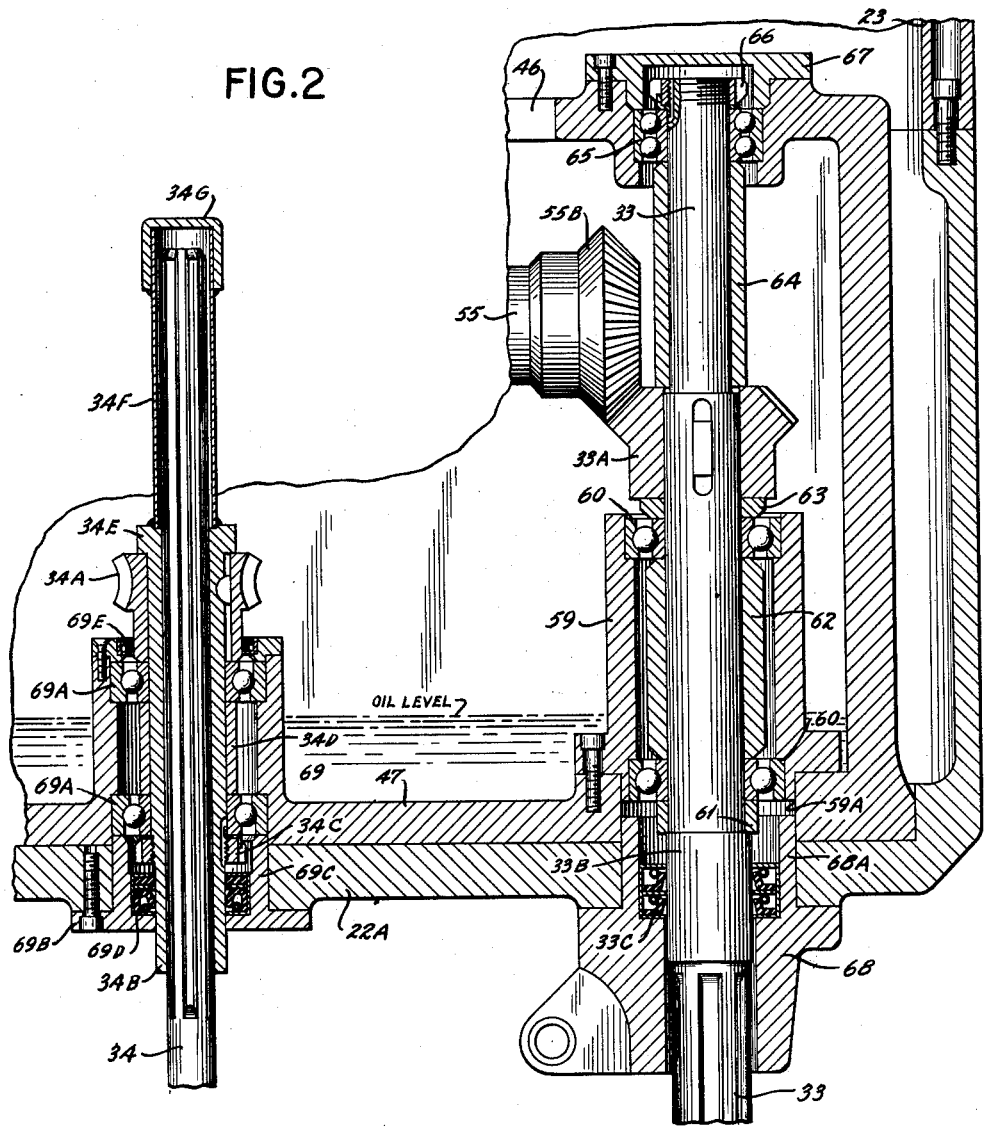
Figure 5:
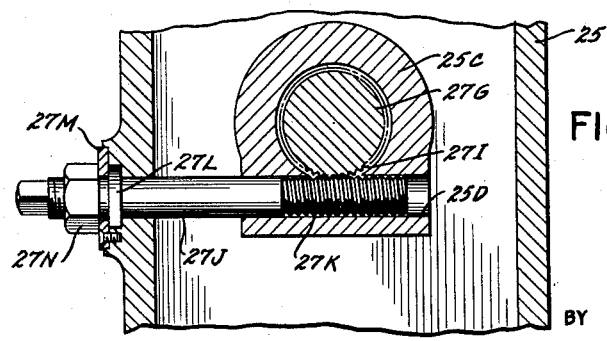
Figure 3:
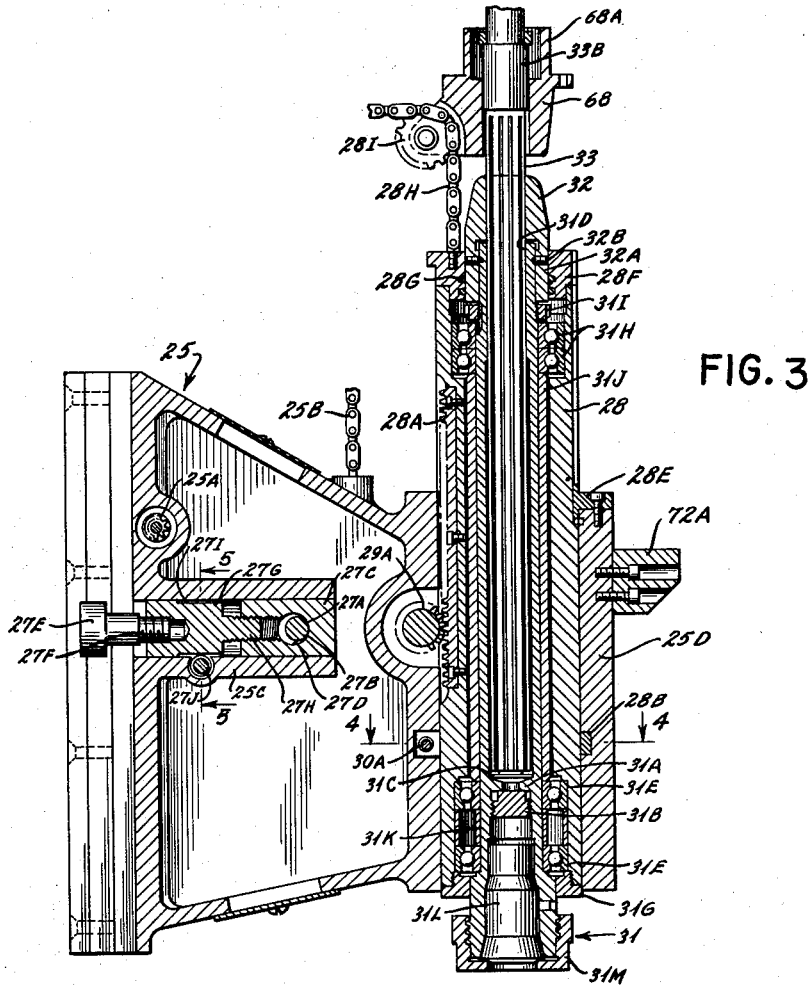
Figure 4:
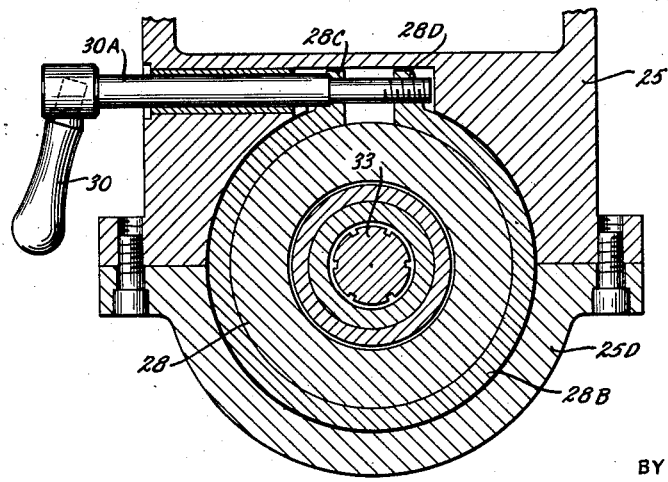

Other and further objects will be apparent as the description proceeds and upon reference to the accompanying drawings wherein:

FIG. 1 is a perspective of the jig borer of the present invention showing the open top gear housing closed with a cover, the movable quill housing with the vertically adjustable quill and the hollow spindle telescoping onto the splined spindle drive shaft extending downwardly from the upper gear housing, the view also showing the optical reading devices or viewers for the positioning scales of the transverse and longitudinally movable slides and showing the convenient arrangement of hand wheels for controlling the slides;

FIG. 2, an enlarged fragmentary vertical section through the spindle shaft and down feed shaft, showing the bearings and oil seals;

FIG. 3, a fragmentary vertical section through the quill housing, quill and spindle, showing the binder clamp adjustment and the bearing arrangement and spline drive shaft connection for the spindle;

FIG. 4, an enlarged horizontal section taken substantially on line 4—4 of FIG. 3, showing the quill binding clamp;

FIG. 5, a fragmentary section taken substantially on line 5—5 of FIG. 3, showing the turnbuckle adjusting arrangement to obtain accurate binding force between the quill housing and the ways on the column;

FIG. 6, a fragmentary section taken substantially on line 6—6 of FIG. 1 showing the clamp support for securing the depth indicating dial to the quill and the stop to limit the downward movement of the quill.

Briefly, the jig borer of the present invention includes a supporting base with an upright column supporting an open top gear-receiving housing at its upper end, in which gear-receiving housing a transmission chassis is removably mounted for insertion and removal of the transmission chassis through the open top. The transmission includes a plurality of shafts, gears and electric clutches and brakes for operating a splined spindle drive shaft and a down feed shaft and for stopping the spindle and down feed shaft. The speed of the shaft is controlled by a control box having push buttons and/or other suitable switches for obtaining two ranges of speed of the spindle shaft and three ratios of speed between the spindle and the down feed shaft. A drive motor of a type providing infinite variations of speed in conjunction with the two ranges of spindle speeds makes it possible to obtain 30 to 1500 r.p.m. spindle speeds with the fine variation being accomplished by push button control.

The quill housing is clamped by an adjustable eccentric clamp to the column and is counterbalanced by suitable weights and moved by a conventional rack and pinion, while the quill is adjustable in the quill housing by suitable means. The spindle is tubular and has a splined driving hub keyed to its upper end which hub and spindle receives the splined spindle drive shaft, with the lower end of such splined spindle drive shaft being telescopingly received within the tubular spindle thereby reducing the overall height. The spindle is supported in accurate preloaded bearings in the quill and the quill can be clamped in fixed position by a separate clamp for use as a milling machine. The vertical adjustment of the quill can be measured with an adjustable dial gauge supported on a clamp provided with stop means to prevent damage to the gauge.

Referring more particularly to the drawings, the jig borer includes a base 20 having an integral upright column 21 extending upwardly from the rear thereof and supporting an open top gear-receiving housing 22 which is closed by a cover 23. Slidably mounted on suitable ways 24 at the front of the column 21 is a quill housing 25 which is vertically adjustable by a hand wheel 26 operating a pinion meshing with a rack for vertical adjustment of the quill housing, a clamp lever 27 being provided to lock the quill housing in adjusted position. The quill 28 is movable vertically by the usual hand wheel 29 for rapid manual adjustment and may be clamped in position by clamp lever 30. The spindle 31 is driven by a conically shaped internally splined driving hub 32, with its short internal spline engaging the external elongated spline at the lower end of the splined spindle driving shaft 33 and with the spline of the drive shaft 33 being received within the hollow spindle 31, thereby reducing the over-all height of the machine while permitting quill and quill housing vertical adjustment to take care of all types of work. A down feed shaft 34 through suitable gearing and suitable clutches controlled by feed-reversing handle 35 operates a worm shaft carrying a hand wheel 36 for manual precise adjustment, with such worm engaging a worm gear on the shaft of hand wheel 29 which shaft carries a pinion 29A meshing with the usual rack 28A on quill 28, the quill being counterbalanced by a weight.

A push button control box 36 is mounted on the end of a supporting lever 37 secured to the column 21 providing for proper and accurate positioning of the control box for easy access to the operator and with a minimum of interference in the operation of the quill rapid feed hand wheel 29. The push buttons and the controls on the control box 36 provide for all of the adjustments in feed and speed of the transmission by controlling the clutches and brakes in the transmission.

A transversely movable slide 38 is moved manually by a hand wheel 39 and the position thereof is read by a microscope and projector optical arrangement 40 supported on slide 38 for reading a scale 41 mounted on the right side of the jig borer base as viewed from the operator's position.

A longitudinally movable slide 42 is movable by means of the conventional screw feed which is operated by a hand wheel 43 selectively clutched by clutch means 44 to a shaft extending rearwardly and carrying a helical gear meshing with a helical gear on the usual screw feed shaft for operating the longitudinal slide 42, thereby avoiding the slide 42 is measured by microscope optical arrangement 45 mounted on transverse slide and which includes a light projector and a viewing screen which reads a scale 46 on the longitudinal slide 42.

The bearing arrangement for the downwardly extending splined spindle drive shaft 33 includes a removable hub 59 secured to the bottom wall 47 of the chassis by suitable bolts and such hub carries the outer races of preloaded ball bearing anti-friction ball bearing assemblies 60, the inner races of which are maintained in accurate position by a collar 61 engaging a shoulder of splined shaft 33, which collar engages the inner race of lower bearing 60, which in turn engages a spacing sleeve 62, which engages the inner race of upper bearing 60, which engages a beveled washer 63 abutting the bevel gear 33A, which is retained in place by a sleeve 64 abutting the inner race of anti-friction thrust bearing 65, which inner race is held in abutting relation by a nut 66 threaded on the upper end of the shaft 33 and held in position by suitable locking means, a cap 67 closing the opening in the upper wall 46 of the chassis. The washer 63 is shaped to throw oil away from the shaft 33 to prevent excessive lubricant from finding its way into the hub 59.

The transmission chassis is accurately positioned by means of a removable oil-retainer supporting hub 68 which is provided with a tubular portion 68A which is snugly received in a bottom wall 22A of the gear housing and also received in a hub receiving opening 59A of the transmission chassis to provide accurate alignment. The tubular portion 68A provides a space between the inner periphery of such portion and an enlarged portion 33B of the shaft 33 to receive spring-pressed oil retainers 33C to prevent loss of oil when the oil is maintained at a suitable level below the top of boss 59 and also below the level of another boss 69 for the down feed shaft 34.

The boss 69 extends upwardly from bottom 47 of the transmission chassis and supports the outer races of bearings 69A, 69A, the inner races of which rotatably support the inwardly splined outwardly flanged sleeve 34B with the inner races being maintained in accurate spaced relation by means of a nut 34C abutting the inner race of lower bearing 69A which abuts spacing sleeve 34D, which abuts the inner race of upper bearing 69A, which abuts worm gear 34A, which abuts the shoulder formed by the integral flange 34E of the sleeve 34B, thereby positively locking the parts in assembled relation. The worm gear 34A is keyed to the sleeve 34B. An extension sleeve 34F is secured to the flange 34E and includes a cap 34G to prevent loss of lubricant through the sleeve 34B.

An oil-retaining hub 69B having a tubular portion 69C receives one or more oil retainers 69D to seal lubricant in the hub 69 while permitting rotation of the sleeve 34B without loss of lubricant. Another lubricant retainer 69E is mounted in a plate at the top of hub 69 and engages the hub of gear 34A, thereby preventing oil from leaking.

Referring to FIGS. 3 and 5, the quill housing 25 is movable vertically by the usual pinion gear 25A which engages the conventional rack 24A and is operable by a shaft manipulated by hand wheel 26, the quill housing being counterbalanced by a chain passing over suitable pulley sprockets to a weight in the column 21. To lock the quill housing in position, the lock lever 27 fixed to shaft 27A operates an eccentric or cam 27B, which is received in a transverse bore 27D in a cylindrically shaped slide member 27C slidably mounted in a cylindrical bore in a boss 25C, with the eccentric 27B engaging the cooperating surface 27D, whereby rotation of shaft 27A will cause lateral movement of slide 27C. A T-head quill housing bolt 27E has its enlarged head engaging the cooperating flanges of the track 24 and the threads 27F being received in a correspondingly threaded bore of a turnbuckle member 27G having a threaded extension 27H received in a threaded bore in slide 27C, with the threads on extension 27H and the bore in slide 27C being opposite-handed to the thread on T-headed bolt 27E, whereby rotation of the usual hand wheel at the end of the longitudinal slide and simplifying adjustment. The longitudinal position of turnbuckle member 27G causes slide 27C and T-headed bolt 27E to move together or separate.

To provide rotation of turnbuckle member 27G and thereby accomplishment adjustment of the spacing of the head of bolt 27E and slide 27C slots 27I are provided in turnbuckle member 27G and extend longitudinally thereof, forming teeth therebetween. Through the boss 25C is a smooth bore 25D which slidably and rotatably receives a shouldered bolt 27J having threads 27K which engage the teeth formed by slots 27I, thereby providing a type of worm and worm gear to provide for rotation of turnbuckle member 27G by rotation of bolt 27J when the bolt 27J is prevented from axial movement.

A shoulder 27L on bolt 27J is received in a recess on the left side of quill housing 25 and a washer 27M engages the shoulder and maintains the bolt 27J against axial movement. A square head within the root diameter of bolt 27J and a threaded portion are provided outwardly of the shoulder 27L. A locking nut 27N provides for securing the bolt 27J in fixed position against axial and rotative movement, thereby maintaining the adjustment of the turnbuckle member 27G.

It will thus be seen that an accurate adjustment can be obtained so that the binding lever 27 can operate at maximum efficiency without requiring excessive forces and when wear does occur proper adjustment can be made.

Referring more particularly to FIGS. 3 and 4, the quill 28 is provided with the usual rack 28A which is operated by pinion 29A controlled by hand wheel 29 and by the usual feed operating mechanism to permit both manual adjustment and power feed. Where it is desired to hold the quill in a definite position, a clamping ring 28B is received in a groove in the quill housing base and a registering groove in the quill housing cap 25D, with the clamping ring having a smooth bore in one lug 28C and an internally threaded bore in the other lug 28D. A shaft 30A having one end threaded into lug 28D is rotatably mounted in a suitable bearing in the quill housing 25 and is operated by the handle 30, thereby producing a clamping action between a shoulder on the shaft and lug 28C and the threads in lug 28D on the ring 28B to bind the quill 28 in any desired position.

The spindle 31 is tubular and is provided with an inturned flange 31A immediately above the collet receiving bottom end and a screw plug 31B is threaded into threads therebelow to close the central opening formed by the flange 31A. The flange 31A supporting a washer 31C for limiting the upward movement of the spindle by abutment of such washer 31C with the lower end of splined shaft 33. To drive the spindle 31 from the splined shaft 33, the internally splined driving hub 32 is provided with a downwardly extending tubular portion 32A having a pair of diametrically opposed keyways receiving the flat edges of Woodruff keys with the circular edges of the keys received in circular slots in the outer periphery of the spindle 31, the splined hub 32 being additionally retained on the spindle by locking set screws 32B. The upper end of the spindle 31 is provided with a smooth internal bore 31D immediately adjacent the internally splined hub 32 snugly receiving the outer periphery of the splined portion of the shaft 33 to assure accurate alignment and guidance to the splined shaft 33 thereby avoiding lateral forces.

The spindle 31 is rotatably mounted in the quill 28 by means of a pair of preloaded super precision bearings 31E, the outer races of which are received in a couterbore in quill 28 and spaced apart by an accurate spacing ring 31F and held in position by an internally threaded collar 31G threaded into the quill and abutting the outer races of the lower bearing maintaining the outer races in accurate position on the quill. Upper precision bearings 31H are received in a counterbore in quill 28, and the inner races thereof are held in position by a locking nut 31I which abuts the inner race of upper bearing 31H, the inner race of the lower bearing 31H abutting a spacing sleeve 31J which in turn abuts the inner race of the upper of the lower bearing 31E, which abuts the inner spacing sleeve 31K which abuts the inner race of the lower of the lower bearings 31E which abuts a shoulder on the spindle thereby obtaining the preloaded condition of the bearings and the accurate location of the spindle in the quill to maintain accurate operation. A tool-retaining collet 31L is held on position by the clamping collar 31M, thereby providing for mounting of the boring, milling, or similar tool.

To maintain the quill against rotation, a key element 28E is secured to the upper end of the quill housing cap 25D and is received in a longitudinal slot in the quill.

The quill is supported by means of a cap 28F suitably fixed to the upper end of the quill and serving to provide a seal between the tubular portion 32A of the splined hub 32 and the bearing by the provision of sealing elements 28G in suitable grooves. A suitable chain 28H passes over a pulley sprocket 28I on hub 68 and other pulley sprocket to a suitable counter-weight to balance the weight of the quill and the tool held therefor.

The movement of the quill 28 is measured by a dial type gauge 72 which is supported on a clamp ring 73 which is secured around the quill 28 by means of a clamping screw 73A which provides for vertical adjustment of the clamping ring on the quill thereby varying the position of the dial gauge 72 relative to the quill and relative to the boring tool secured to the spindle. A stop screw 73B is threaded into an internally threaded bore in a lug 73C on the clamping ring and the adjustment of such stop screw is maintained by a locking nut at the upper surface of the clamping ring, such stop screw abutting against an abutment shoulder on the quill housing 25. The quill cap 25D carries a lug 72A which cooperates with the feeler pin 72B of the dial gauge 72 so that when the pin 72B engages the lug 72A the dial indicator hand on the dial gauge 72 will be moved thereby indicating the actual relative motion of the quill 28 with the spindle and tool carried thereby relative to the quill housing so that the operator can accurately meausre the movement to 1,000th of an inch. The dial gauge 72 is supported by means of a laterally extending supporting bar 72C which engages a connecting element 72D having bores in offset right angular relation with the bar 72C engaging one bore and another bar 72E being received in the other bore and held therein by suitable set screws or the like. The bar 72E is supported from the ring 73 by means of a lug 73D secured to or integral with the clamping ring 73 and having a vertical bore receiving the bar 72E for adjustment of such bar by a set screw 72F thereby providing for vertical adjustment of the dial gauge 72 with respect to the clamping ring 73.

It will thus be seen that the accurate measurement of depth can be made by the dial gauge 72 while the stop screw 73B assures that the dial gauge will not be damaged by excessive movement of the pin 72B.

From the above description it is believed that the operation of the equipment should be obvious to one skilled in the art and the advantages of the clutch and brake drives in the transmission provide for rapid gear change for both drilling speed and feeding speed with no danger of damage to gears, and the work can be accurately located by the operator who can stand in substantially one position and read the positioning scale while making one adjustment with one hand and the other adjustment with the other hand and as soon as the proper adjustment for positioning the work has been made and the slides have been locked in place the quill holder and the quill can be manually moved to approximately the correct position and after the quill holder is locked in place the feed and drilling speeds can be controlled directly by the push button arrangement to obtain all the necessary variatons in speed to obtain maximum rate of boring and precisely correct feed by simply making the correct push button adjustment.

Since all of the controls are within the reach of an operator in one position the speed of accomplishing work is greately increased.

It will be apparent that changes may be made within the spirit of the invention as defined by the valid interpretation of the appended claims.

What is claimed is:

1. In a jig borer having a base with a work supporting surface, an upright column with vertically disposed slideways along one side, and a variable speed transmission fixed to the upper portion of the column; a movable quill housing slideably mounted on said slideways, means for fixing said quill housing in selected adjusted position, a quill slideably mounted in said quill housing, quill moving means carried by said quill housing for moving said quill in a generally vertical direction relative to said quill housing, clamp means for securing said quill in adjusted position, a spindle rotatably carried by said quill, a splined drive shaft drivingly connected to said transmission and extending only from one side thereof, an internally splined hub connecting said drive shaft to one end of said spindle to cause rotation of said spindle in any vertical position of said quill, at least one precision bearing disposed at each end of said spindle and located between said spindle and said quill, means connecting said bearings for preloading the same to facilitate accurate operation of said spindle, and a tool holder at the other end of said spindle, whereby said quill housing may be moved up and down said column and fixed in adjusted position and said quill may be moved generally vertically relative to said quill housing while being rotatably driven from said transmission.

2. The structure of claim 1 in which said quill moving means is connected selectively to said transmission.

References Cited in the file of this patent

UNITED STATES PATENTS

| | | |
|---|---|---|
| 2,022,436 | Schauer et al. | Mar. 26, 1935 |
| 2,093,546 | Buhr | Sept. 21, 1937 |
| 2,131,973 | Rusnak | Oct. 4, 1938 |
| 2,301,977 | Schwenecke | Nov. 17, 1942 |
| 2,490,307 | Karr | Dec. 6, 1949 |
| 2,621,531 | Uhink | Dec. 16, 1952 |
| 2,683,998 | Leggett | July 20, 1954 |
| 2,753,725 | De Vlieg | July 10, 1956 |
| 2,826,945 | Kleinsorge | Mar. 18, 1958 |
| 2,838,967 | Meyer | June 17, 1958 |
| 2,905,027 | Budney et al. | Sept. 22, 1959 |

FOREIGN PATENTS

| | | |
|---|---|---|
| 701,306 | Germany | Jan. 14, 1941 |